United States Patent [19]
Horvath et al.

[11] 3,886,326
[45] May 27, 1975

[54] DATA-SENSING VERIFICATION SYSTEM AND METHOD

[75] Inventors: Edward E. Horvath; Robert M. Janoski, both of Madison, Wis.

[73] Assignee: T & T Technology, Inc., McFarland, Wis.

[22] Filed: June 8, 1973

[21] Appl. No.: 368,332

[52] U.S. Cl....235/61.6 E; 235/61.7 R; 235/61.11 E; 235/61.12 N; 35/48 B
[51] Int. Cl........................... G06k 5/00; G06k 7/14
[58] Field of Search.. 235/61.11 R, 61.11 E, 61.6 E, 235/61.7 R, 61.12 N; 340/146.3 AG; 35/48 B

[56] References Cited

UNITED STATES PATENTS

| | | | |
|---|---|---|---|
| 3,284,929 | 11/1966 | Azure, Jr. | 235/61.6 E |
| 3,619,569 | 11/1971 | Hoehn et al. | 235/61.6 E |
| 3,628,031 | 12/1971 | Azure, Jr. | 235/61.6 E |
| 3,643,348 | 2/1972 | Azure, Jr. | 235/61.6 E |
| 3,715,568 | 2/1973 | Azure, Jr. | 235/61.6 E |

*Primary Examiner*—Stanley M. Urynowicz, Jr.
*Attorney, Agent, or Firm*—Dressler, Goldsmith, Clement & Gordon, Ltd.

[57] ABSTRACT

A data-sensing verification system and method for verifying the validity of a signal representative of data contained in a marking location on a document having a plurality of control marks associated with the marking location. The data is sensed and a signal is generated representative thereof. The control marks are sensed and control signals are generated in response thereto. The data signal is sampled in response to the control signals and an output indicative of the validity of the data signal is generated as a function of the existence of a selected relationship between the samples.

28 Claims, 8 Drawing Figures

DATA-SENSING VERIFICATION SYSTEM AND METHOD

BACKGROUND OF THE INVENTION

Techniques of mark sensing are, of course, well known. Such techniques involve the use of cards or other documents which are encoded with data or information by the application of suitable marks in specified areas on the card or document.

Punched cards incorporate one well known approach for marking such cards. Another approach that is particularly suitable for marking cards manually is the application of marks, e.g., optically or magnetically readable marks, on the surface of the card within specified areas, which marks can then be sensed by corresponding systems, e.g., optical and magnetic systems.

In manually marking such cards, it has been recognized that the marks applied to the card may not be uniform, i.e., they may vary in size and intensity or may have other variable characteristics. The result maybe erroneous and unreliable sensing and detection of the information coded onto the card by the application of such marks. For example, when a mark is erroneously applied to a card, attempts to erase the mark often are not completely sucessful; or an incomplete mark may be applied within a specified location.

It is necessary, therefore, to provide some system for verifying the accuracy of the sensed information or data, i.e., the existence or non-existence of marks in the specified marking locations, to accurately process the information represented by the data within the various marking locations on the card.

Various approaches have been disclosed for providing such verification and for eliminating erroneous mark sensing. One approach, as exemplified in U.S. Pat. No. 3,588,481, is to scan a mark a plurality of times with a moving optical or other scanning beam. Appropriate outputs are provided each time the beam scans the marking location and the character of the mark is evaluated by comparing the outputs of the various scans. Another approach, as reflected in U.S. Pat. No. 2,817,480, is to read each marking location at separate spaced sensing stations, and to evaluate the separate outputs.

These approaches, which involve various ways of scanning a location a plurality of times, have not been completely satisfactory, are relatively complex, involve undesirable redundancy of components, as well as function and operation, and, of course, involve substantial and increased systems cost.

It would be highly desirable to be able to reliably verify the accuracy of the sensed marking location without substantially increasing the complexity or cost of the mark sensing system.

SUMMARY OF THE INVENTION

In accordance with the present invention there is provided a system for verifying the validity of the data or information signal resulting from sensing marking locations which is simple, inherently reliable, and involves minimal additions to the system.

In accordance with the present invention the signal representative of the sensed data is sampled a plurality of times in response to control signals generated from the sensing of control marks on the document and the sampled information signals are compared to determine the accuracy of the information sensed. The system of the present invention utilizes only a single information signal for each marking location and involves only the sensing of the mark a single time, but samples the single signal a plurality of times at selected sampling intervals in order to arrive at a validity determination.

More specifically, the system of the present invention includes a data sensing means responsive to data, in the form of the presence and/or absence of a mark within designated marking locations, for generating an information or data signal representative thereof. The information or data signal, as is known, has a characteristic which varies as a function of variations in the form of the data, in particular, as a function of the intensity and duration of the mark sensed. As is also well known, a plurality of marking locations may be sensed simultaneously, the signals from each location being processed in parallel. For ease of description the processing of a signal from only a single marking location will be described in detail.

The document or card containing the marking locations is also provided with a plurality of control or timing marks associated with the marking locations. Control mark sensing means are provided for sensing the control marks and for generating a control signal in response thereto. Means responsive to the control signal effects sampling of the information signal from each marking location at spaced time intervals determined by the positional relationship of the control marks to the marking location. The information signal samples are compared and a data validity or error signal is generated in response to a preselected relationship between the samples.

Numerous other advantages and features of the present invention will become readily apparent from the following detailed description of the invention and of one embodiment thereof, from the claims and from the accompanying drawings in which each and every detail shown is fully and completely disclosed as part of this specification, and in which like numerals refer to like parts.

DESCRIPTION OF A SPECIFIC EMBODIMENT

Figure 1:
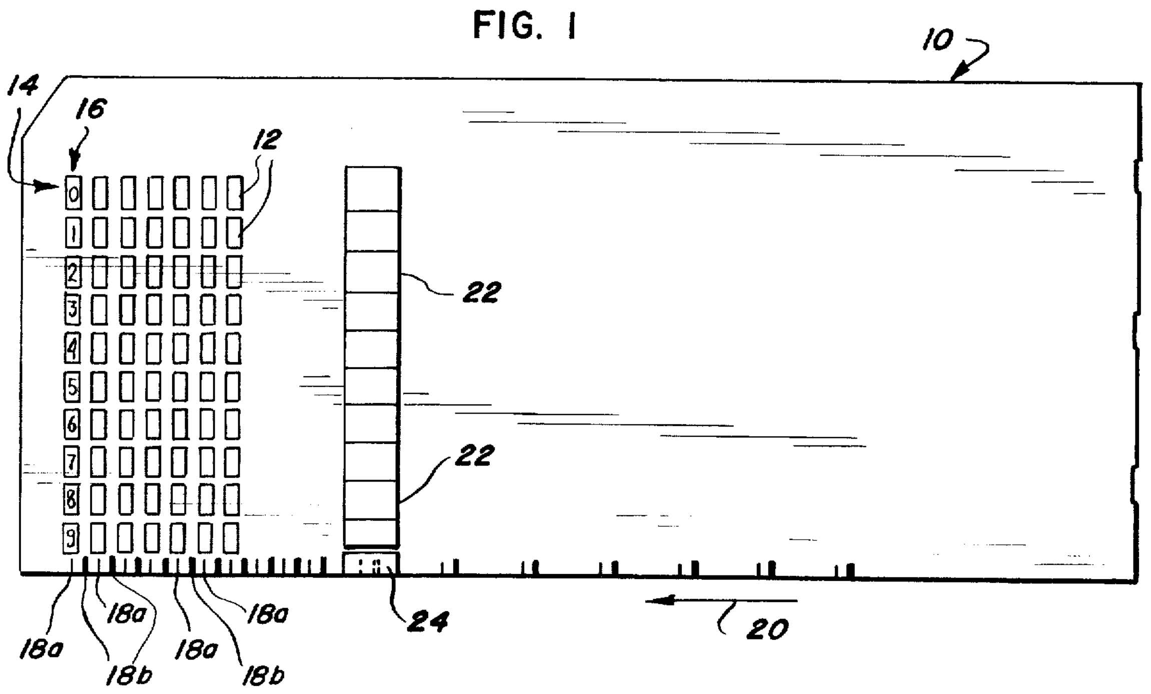
FIG. 1 shows a document having a plurality of marking locations and associated timing or control marks in accordance with the present invention.

While this invention is susceptible of embodiments in many different forms, there is shown in the drawing and will herein be described in detail one specific embodiment, with the understanding that the present disclosure is to be considered as an exemplification of the principles of the invention and is not intended to limit the invention to the embodiment illustrated.

Referring to FIG. 1, there is shown a machine readable document in the form of a card 10. The card 10 includes the usual plurality of marking locations 12 arranged in an array of rows 14 and columns 16.

The card 10 also includes a row of control or timing marks 18 along one edge thereof extending parallel to the rows 14 of marking locations 12. A plurality of control marks 18 are associated with each column 16 of marking locations 12 and are utilized to effect the verification of data sensed in the associated column of marking locations. Each control mark is associated with a portion of the marking location 12 in the column 16 corresponding thereto.

In the embodiment of card 10 shown in FIG. 1, control marks 18*a* are located generally midway of the marking locations 12 in the associated column 16, and control marks 18*b* are located just to one side of the marking locations 12 in the associated column 16. It should be understood that more than two control marks can be associated with each of the marking locations in each column 16, although, for convenience, the present invention will be described with respect to the embodiment shown in the drawing.

As is well known, sensing of the card 10 is accomplished by advancing the card at a selected steady rate of travel in the direction of the arrow 20 in FIG. 1 past a plurality of data sensors 22 and a control sensor 24. Each of the sensors 22, 24 senses successively the marking locations 12 and the timing marks 18, respectively in each row, with the marking locations 12 in each column being sensed simultaneously. For convenience, the sensing of only a single marking location 12 and its associated control marks 18*a*, 18*b* will be described, although it is appreciated that the operation of the present invention is the same for each of the marking locations sensed.

Figure 2:
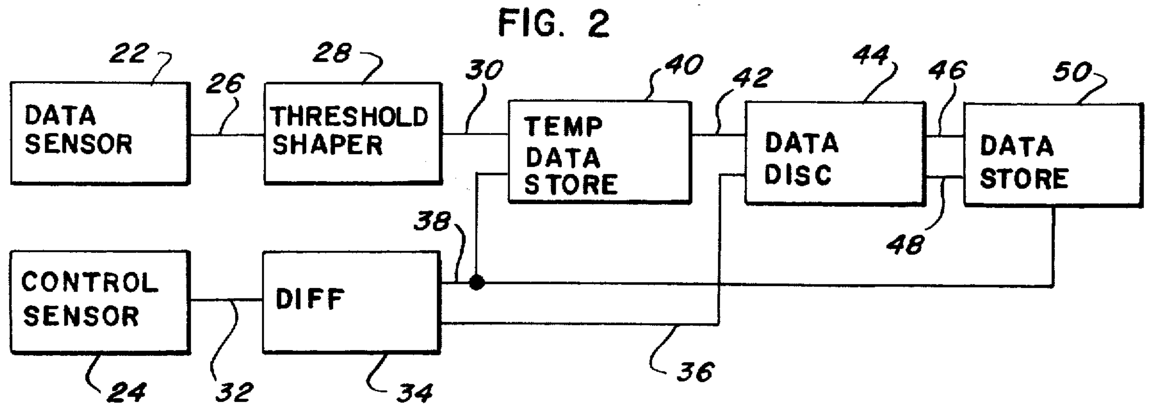
FIG. 2 is a block diagram of the mark sensing verification system incorporating the present invention.
Figure 8:
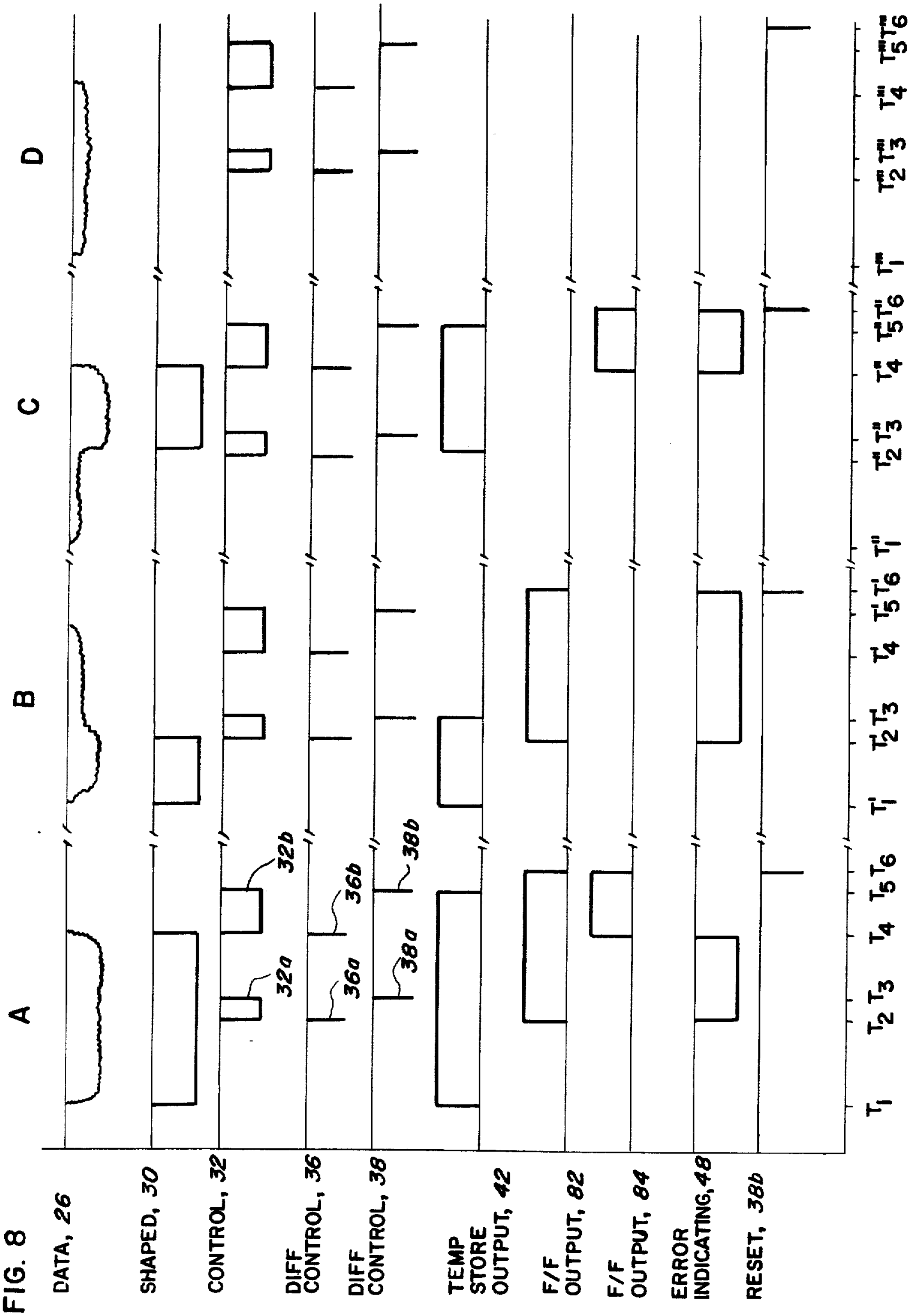
FIG. 8 is a timing diagram of the various signals processed through the system in accordance with the present invention.

Referring now also to FIG. 2, and more generally to FIG. 8, as the card 10 is moved past the data sensors 22, a signal is generated representative of the marks sensed. The data signal output 26 or each of the sensors 22 is applied to the input of a threshold/shaping circuit 28, the output 30 of which is a generally constant amplitude pulse which exists for the period of time during which the data sensor output 26 exceeds a preset threshold level. Pulse shaping is usually necessary because variations in the manually applied marks within the marking locations produce corresponding variations in the data signal 26. As a result of marking variations, the data signal can vary in duration, as a function of the width of the mark, and in amplitude, as a function of the intensity of the mark.

The control sensor 24 senses the control marks 18*a* and 18*b* and generates an output signal 32 representative thereof in the form of generally uniform square wave pulses 32*a*, 32*b*. The control signal pulses 32*a*, 32*b* are generally uniform because the control marks 18 have been preprinted on the card 10 and present uniform leading and trailing edges and are of uniform intensity, although of varying width.

The control pulses 32*a*, 32*b* are differentiated in a control signal differentiator 34 to produce a plurality of control impulses 36, 38 generated in response to the leading and trailing edges of the control marks, respectively.

The shaped data signal output 30 from the threshold/shaping circuit 28 is applied to the data input of a temporary data storage circuit 40. The trailing edge control impulses 38*a*, 38*b* are applied to the reset input of the temporary data storage circuit 40.

The output 42 of the temporary data storage circuit 40 is applied to the data input of a data discriminator 44. The leading edge control impulses 36*a*, 36*b* are applied to the gating input of the data discriminator 44 and gate the output 42 of the temporary data storage circuit 40 into the data discriminator 44. The data discriminator 44 is operative in response to each of the leading edge control pulses 36*a*, 36*b* to sample the output 42 of the temporary data storage circuit 40.

The data discriminator 44 generates two outputs, a data output 46 and an error or validity indicating output 48, both of which are applied to a suitable data storage or memory circuit 50. The data output 46 and error indicating output 48 are gated into the memory circuit 50 by the last trailing edge impulse 38*b*. The error indicating output 48 is indicative of a comparison between the samples stored in the data discriminator 44.

In the embodiment disclosed, when two control marks 18*a*, 18*b* are utilized with each column 16 of marking locations 12, unanimous error logic is selected. Thus, if the two samples stored in the data discriminator are the same, a no error or validity indicating output 48 is generated. If the two samples stored in the data discriminator are different, then an error indicating output is generated. It can be appreciated that when more than two control marks 18 are utilized, unanimous or majority logic can be employed, as desired.

Figure 3:
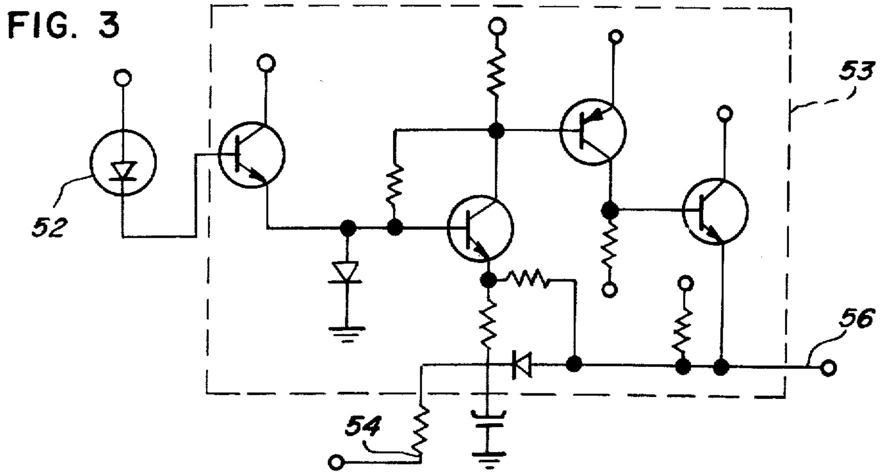
FIG. 3 is a schematic diagram of a mark sensing circuit suitable for use in the system of FIG. 2.

A sensing circuit suitable for use as the sensors 22, 24 is shown in FIG. 3. The sensing circuit incorporates a light sensing diode or other suitable photo-sensitive device 52 and an amplifying circuit 53. This sensing circuit is adapted to sense optically detectable marks. It can be appreciated that other sensing circuits may be employed with other types of marks, e.g., magnetic sensing. The sensing circuit is energized by the introduction of a card 10 into the system which completes the circuit by closing a gate at terminal 54.

Figure 4:
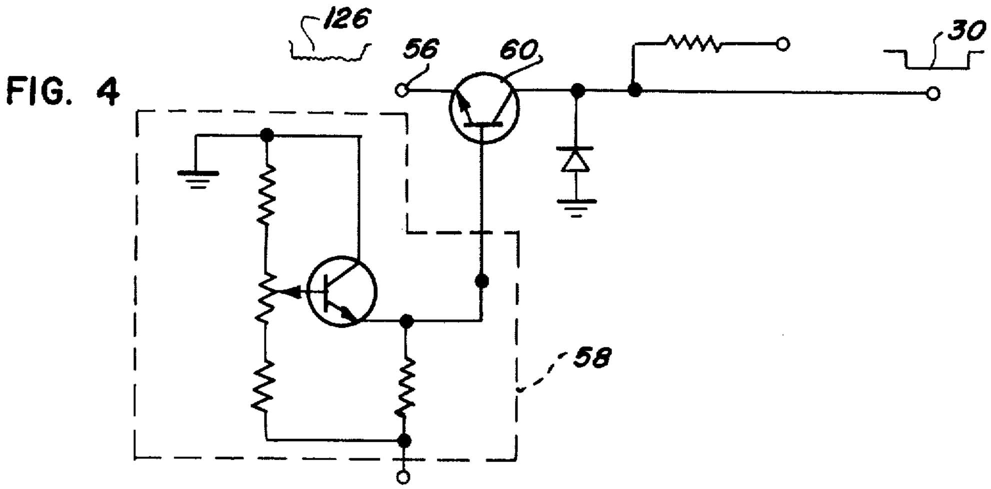
FIG. 4 is a schematic diagram of a signal shaping circuit suitable for use in the system of FIG. 2.

When used as a data sensor 22, an output 26 appears on output line 56 when the photo-sensitive device 52 senses a darkened area. The signal 26 is applied to the input of the threshold/shaping circuit 28, FIG. 4.

The threshold/shaping circuit 28 includes an adjustable threshold circuit 58 which varies the bias applied to transistor 60 so that an input 30 is generated only in response to an input 26 which exceeds a preselected amplitude. The bias is adjusted so that marks of a selected minimum intensity must be sensed in order to generate a shaped output 30 indicative of the existence of a mark in a marking location 12.

The shaped output 30 of the threshold/shaping circuit 28 is a constant amplitude pulse having a duration corresponding to the time the amplitude of the sensed output signal 26, i.e., the input to transistor 50, is greater than the threshold level.

Figure 5:
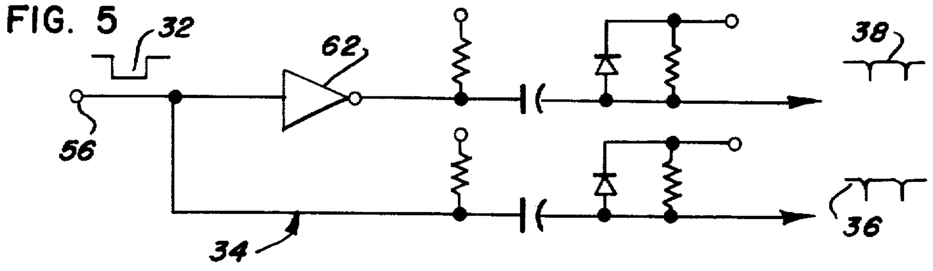
FIG. 5 is a schematic diagram of a timing signal differentiator circuit suitable for use in the system of FIG. 2.

The output 32 of the circuit of FIG. 3 when used as a control sensor 24 takes the form of generally uniform amplitude square wave pulses, since the control marks, as explained above are generally uniform in shape and intensity. The output control pulses 32 of the control sensor 24 are applied to the input of the differentiator 34, (FIG. 5), which produces the plurality of control impulses 36, 38 corresponding to the leading and trailing edges of the timing pulses, respectively. It can be appreciated, that the trailing edge of each pulse 32, which would otherwise be positive, must be inverted by an inverter 62 in order to produce the desired negative impulses 38.

Figure 6:
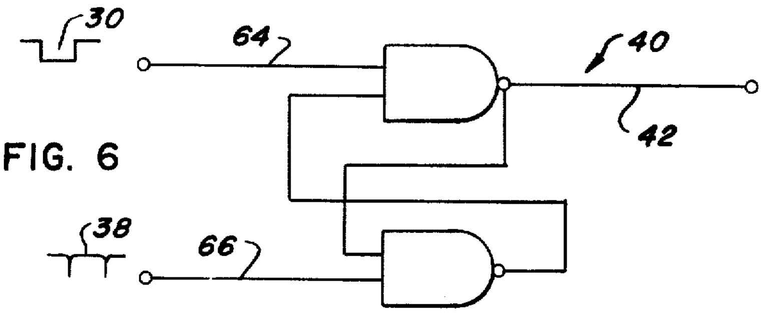
FIG. 6 is a logic block diagram of temporary data storage circuits suitable for use in the system of FIG. 2.
Figure 7:
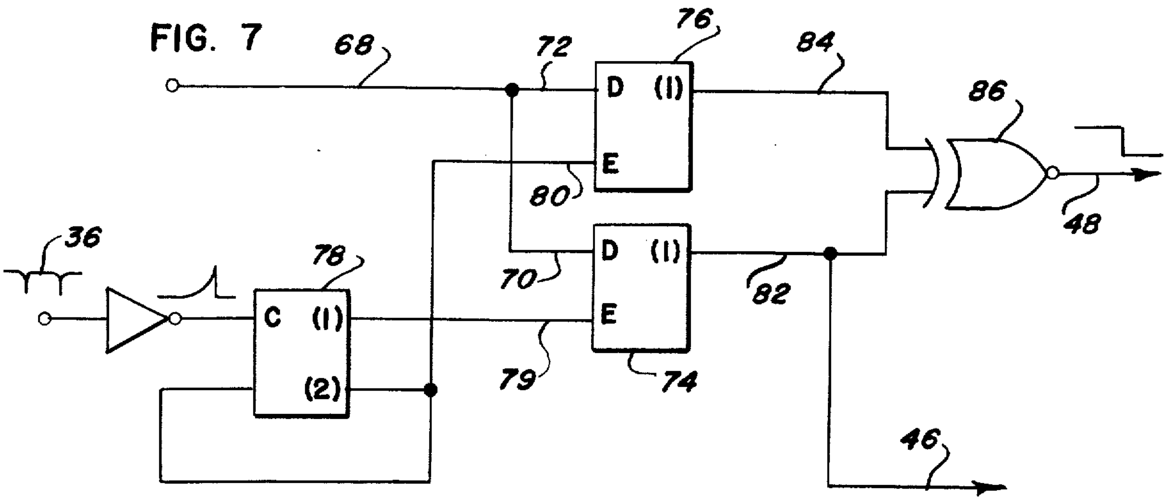
FIG. 7 is a logic block diagram of a data discriminator suitable for use in the system of FIG. 2.

The output 30 of the threshold/shaping circuit 28 is applied to the data input 64 of the temporary data storage circuit 40, (FIG. 6), which generates its output 42 corresponding to the value of the data input. Thus, if the shaped data signal 30 is indicative of a mark, the output 42 of the temporary data storage circuit 40 is also indicative of a mark, and remains unchanged until reset. The temporary data storage circuit 40 is reset by the trailing edge control impulses 38 applied to the reset input 66; however, impulses 38 are effective to reset the temporary data storage circuit 40 only if there is no mark signal at the data input 64.

The output 42 of the temporary data storage circuit 40 is applied to the data input 68 of the data discriminator 44, which is connected to the data or set inputs 70, 72 of each of a pair of gated storage flip flops 74, 76. The leading edge control impulses 36 are applied to the input of a first control or trigger flip flop 78 of the data discriminator 44. Flip flop 78 applies alternating gating pulses to the gate inputs 79, 80 of the gated storage flip flop 74, 76, thereby gating into each storage flip flops 74, 76 the signal on the corresponding data inputs 70, 72.

The application of a pulse on the gating input to the storage flip flop effects sampling of the signal present at the corresponding data input and stores the value of that signal in the storage flip flop.

Signals on the outputs 82, 84 of each of the storage flip flops 74, 76 corresponds to the value of the signals stored in the storage flip flops. These signals are applied to the inputs of an exclusive OR gate 85, the output of which is the validity or error indicating signal 48. Thus, comparison of the value of the data signal associated with respective portions of the marking location is made. When the signals into both inputs of exclusive OR gate 86 are the same, the output is one value, indicating that the data sensed is valid. When the inputs to the exclusive OR gate 86 are different, the output 48 gate 86 assumes a second value indicating unreliable data. The data output of the data discriminator 44 can be taken off either of the outputs 82, 84 of the storage flip flop 74, 76, since the two outputs must be the same for a no error condition to exist.

Operation of the system will be described with reference to FIG. 8. At time T1 the data sensor 22 begins to generate an output data signal 26, representative of the data being sensed. Assuming that at the T1 the signal initially exceeds the threshold limit, the shaped signal 30 also commences at the time T1. Since in example A in FIG. 8, the mark is assumed to fill the entire marking location, data signal 26 persists from time T1 through time T4, as does the shaped output 30 of the threshold/shaping circuit 28, illustrating the correspondence between the width of the marking location and the time interval T1–T4.

Control pulse 32*a* resulting from the data sensor 24 sensing the control mark 18*a* commences at time T2 and terminates at time T3, and control pulse 32*b* corresponding to the sensing of control mark 18*b* commences at time T4 and terminates at time T5. The differentiated first and second leading edge impulses 36*a* and 36*b* occur at times T2 and T4 the differentiated first and second trailing edge impulses 38*a* and 38*b* occur at times T3 and T5.

The output of the threshold/shaping circuit 28, the shaped output pulse 30, is applied to the data input 64 of the temporary storage circuit 40, the temporary data storage circuit 40 generates an output 42 in response to the applied pulse 30, the output 42 being applied to the data input 68 of the data discriminator 44, i.e., the data or set inputs 70, 72 of each of the gated flip flops 74, 76. It may be seen from FIG. 8 that both shaped pulse 30 and output 42 assume a first value when the threshold is exceeded by data signal 26, and a second value which signal 26 is below the threshold.

At time T2, the first leading edge control impulse 36*a* is applied to the input of trigger flip flop 78 of the data discriminator 44 and causes a gating pulse to appear at the set input 79 of gated storage flip flop 74. The gating pulse gates the signal at the data input 70 into the flip flop 74 to sample the value of the output 42 at time T2 and to store the sample value corresponding to the data sensed within the first half of the mark location in the flip flop 74. This sample value which is stored in flip flop 74 is the result of an instantaneous sampling at time T2, yet nevertheless is a function of whether or not the signal representative of the sensed data has exceeded the predetermined intensity in the first half of the marking location, since the shaped signal 30, and thus output 42 which is sampled, vary between first and second levels in accordance with the relationship of the data signal 26 to the predetermined threshold or intensity. The resultant signal on the output 82 of the storage flip flop 74 is applied to the input of the exclusive OR gate 86, causing an error-indicating output 48 to occur at the output of the exclusive OR gate at time T2.

At time T3, the first trailing edge impulses 38*a* is applied to the reset input 66 of the temporary data storage 40, but this reset pulse has no effect since the signal 30 is still being applied to the data input 64 of the temporary data storage circuit.

At time T4, the second leading edge impulse 36*b* is applied to the input of the data discriminator 44 causing a gate pulse at the input 80 of the second storage flip flop 76. This gate pulse stores the value of the signal at input 72 in flip flop 76. The storage flip flop produces a signal at its output 84 corresponding to the value of the signal stored.

Since both inputs to the exclusive OR gate are now the same, the error signal 48 returns to its no error value or state. This of course corresponds to the fact that the sensed data was the same, in both halves of the marking location. The second trailing edge impulse 38*b* is applied to the temporary data storage circuit to reset that circuit, since there is no longer a mark signal at the data input to the temporary data storage circuit. The pulse 38*b* also gates the no error indicating output of the exclusive OR gate 86 into data storage circuit 50, as well as the information signal output of either of the outputs of storage flip flops 74, 76. A delayed second trailing edge pulse 38*b*, effects resetting of the storage flip flops for the next cycle of operation.

Example B illustrates what occurs when a mark is placed in the marking location whose intensity and whose associated data signal 26, exceeds the threshold of circuit 28 only in the first half of the marking location, i.e., generally during time interval T1–T2. In this case temporary storage circuit 40 again has an output 26 commencing at time T1', the first leading edge control impulse 36a at time T2' samples the output 42 of temporary storage circuit 40, causing an output from first storage flip flop 74 to change and produces error signal 48 at time T2'.

Since the magnitude of the data signal 26 decreases below the threshold level at about time T2', the first trailing edge control impulse 38a effects reset of temporary storage circuit 40. Thus, upon occurrence of the second leading edge control impulse 36b, there is no signal on the output line of the temporary storage circuit 40 and this "information" is stored in the second half storage flip flop 76 resulting in no change in the output of that flip flop. As a result, the error signal 48 remains and upon occurrence of the second trailing edge impulse 38b, the error indication is gated into the memory circuit 50.

In example C of example 8, the same result occurs in the case of a mark whose intensity and whose associated data signal 26, exceeds the threshold of circuit 28 only in the second half of the marking location, i.e., generally during interval T2''–T4''. Thus, on occurrence of the first leading edge impulse 36a at time T2'', the information stored in both temporary data storage 40 and the first flip flop 74 is of a no mark indication. As a result, exclusive OR gate 86 does not produce an error signal. However, upon occurrence of the second leading edge impulse 36b, there now being a signal in the temporary storage circuit 40, the data stored in the second half storage flip flop represents a mark indication and exclusive OR gate 86 produces an error signal.

The final example in FIG. 8, example D, is representative of the output when no mark is sensed within a marking location, or where the mark results in a data signal 26 which never exceeds the threshold value of threshold/shaper circuit 28. Since no shaped signal 30 is produced, the outputs of temporary data storage 40 and flip flops 74, 76 do not change. Exclusive OR gate 86 produces a no error signal, and upon the occurrence of the second trailing edge impulses 38b, the lack of error signal, indicating a no error condition is gated into memory circuit 50 along with the data signal 82 or 84.

Accordingly, a data-sensing system has been disclosed which because of its novel design and its utilization of timing or control mark on the document to setup sampling intervals, together with its use of only a single data signal upon which sampling is performed, achieves a marked gain in simplification, and consequent reliability, as compared to earlier expedients. Furthermore, only simple components are utilized and with the lack of redundant operations, speed of operation is not reduced. Despite simplicity, no sacrifice in sampling ability is required; instead, the system affords the flexibility necessary to accommodate all requirements, from those for which a simple two-sample operation provides enough accuracy, to those applications involving a larger plurality of samplings for maximum accuracy and discrimination.

From the foregoing, it will be observed that numerous variations and modifications may be effected without departing from the true spirit and scope of the novel concept of the invention. It is, of course, intended to cover by the appended claims all such modifications as fall within the scope of the claims.

We claim:

1. A data-sensing verification system for indicating the validity of a signal representative of data contained in a marking location on a document having a plurality of control marks associated with said marking location, said data taking the form of the presence or absence of a mark in said marking location, said system comprising:

data-sensing means for sensing data in said marking location and for generating in response to the data sensed a data signal representative thereof, the data signal varying in value as a function of variations in the form of said data;

control mark sensing means for sensing each of said control marks and for generating a plurality of control signals, one in response to the sensing of each control mark; and means for sampling said data signal in response to each of said control signals and for generating an indicating output indicative of the validity of said data signal as a function of the existance of a selected relationship between said samples.

2. A data sensing verification system as claimed in claim 1, wherein said sampling means generates an output indicative of the invalidity of said data signal as a function of the absence of said selected relationship between said samples.

3. A data-sensing verification system as claimed in claim 2, wherein said control mark sensing means senses each of said control marks sequentially to generate time spaced control signals in response thereto, each of said time spaced control signals defining a sampling interval.

4. A data-sensing verification system as claimed in claim 3, wherein said sampling means includes first means responsive to each of said control signals for generating a sample signal representative of the value of the sampled data signal, and second means for generating said validity output in response to a selected relationship between said sample signals.

5. A data-sensing verification system as claimed in claim 4, wherein said first means is responsive to said data signal achieving a selected value during a sampling interval and to the control signal defining said sampling interval for generating a first sample signal.

6. A data-sensing verification system as claimed in claim 5, wherein said first means is responsive to said data signal not achieving said selected value during said sampling interval and to said control signal defining said sampling interval for generating a second sample signal.

7. A data-sensing verification system as claimed in claim 5, wherein said second means is responsive to a selected number of said first sample signals for generating said validity output.

8. A data-sensing verification system as claimed in claim 7, wherein said second means is responsibe to a number of said first sample signals different than said selected number for generating said invalidity output.

9. A data-sensing verification system as claimed in claim 6, wherein said second means is responsive to a selected number of said first sample signals for generating said validity output and is responsive to said selected number of said second sample signals for generating a validity output.

10. A data-sensing verification system as claimed in claim 9, wherein said second means is responsive to a number of said first and second sample signals different than said selected number for generating said invalidity signal.

11. A data-sensing verification system as claimed in claim 1, wherein said data sensing means generates a data signal which varies in value as a function of variations in said data within said marking location.

12. A data-sensing verification system as claimed in claim 11, wherein said data sensing means generates a data signal that varies in amplitude as a function of variations in the intensity of a data mark within said marking location.

13. A data-sensing verification system as claimed in claim 12, including threshold means responsive to said data signal for generating an output consisting of a first modified data signal in response to said data signal having at least a selected amplitude, and a second modified data signal in response to said data signal having less than said selected amplitude.

14. A data-sensing verification system as claimed in claim 13, wherein said sampling means includes first data storage means, and means for applying said modified data signals to said first data storage means, said data storage means generating an output corresponding to the modified data signal applied thereto.

15. A data-sensing verification system as claimed in claim 14, wherein said sampling means includes a plurality of second data storage means corresponding in number to the number of control marks associated with said marking location, means for applying the output of said first storage means to the inputs of each of said second storage means, and means responsive to each of said control signals for gating the output of said first storage means sequentially into successive ones of said second storage means to thereby sample and store the output of said first storage means in response to each of said control pulses, each of said second storage means generating a sample output corresponding to the value of the sample stored therein.

16. A data-sensing verification system as claimed in claim 15, including comparison means responsive to the sample outputs of said second data storage means for generating a validity signal when a preselected number of said sample outputs are the same, and generating an invalidity signal when said preselected number of said sample outputs are not the same.

17. A data-sensing verification system as claimed in claim 15, wherein said sampling means includes a pair of said second storage means, and comparison means responsive to the sampling outputs of said pair of second storage means for generating a validity signal when said sample outputs are the same and generating an invalidity signal when said sample outputs are different.

18. A data-sensing verification system as claimed in claim 15 including signal differentiator means responsive to said control signal for generating first control impulses corresponding to the leading edge of each control mark, and for generating a second control impulse corresponding to the trailing edge of each control mark.

19. A data-sensing verification system as claimed in claim 18 wherein said first data storage means is responsive to each second control impulse applied thereto in the absence of a first modified data signal for generating an output corresponding to said second modified data signal.

20. A data-sensing verification system as claimed in claim 19, in which said second storage means comprises a plurality gated storage flip flops each having a first input connected to the output of said first storage means, and a second input each of said gated flip flops being responsive to a pulse applied to its second input to store the value of the signal applied to its first input and to produce a sample output corresponding thereto.

21. A method for indicating the validity of a signal representative of data contained in a marking location on a document having a plurality of control marks associated with said marking location, said data taking the form of the presence or absence of a mark in said marking location, comprising the steps of:

sensing data in said marking location;

generating a signal representative of the data sensed which varies in value as a function of variations in the form of said data;

sensing each of said control marks;

generating a plurality of control signals, one in response to the sensing of each of said control marks;

generating a plurality of said data signal, one in response to each of said control signals; and generating an output indicative of the validity of said data signal as a function of the existence of a selected relationship between said samples.

22. A method as claimed in claim 21, in which each of said plurality of control marks is associated with respective portions of said marking location, including the step of sensing each of said control marks and the portion of the marking location corresponding thereto.

23. A method as claimed in claim 22, in which each of said control signals defines a time interval associated with said portions of said location, and including the step of storing each of the sampled data signals in response to each of said control signals.

24. A method as claimed in claim 23, including the steps of comparing the stored sampled data signals to determine the relationship therebetween, and generating said validity indicating output as a function of said selected relationship between said stored sampled data signals.

25. A method as claimed in claim 21 including the step of differentiating each of said control signals to produce control impulses corresponding to the leading and trailing edges of each control mark.

26. A method as claimed in claim 25 including the steps of generating a data output having a first value when said data signal is less than a threshold value and having a second value when said data signal exceeds said threshold value during the time interval prior to each trailing edge control impulse.

27. A method as claimed in claim 26 including the steps of sampling said data output in response to each leading edge control impulse, and separately storing each of said sampled data outputs and comparing said stored sampled data outputs.

28. A method as claimed in claim 27 including the step of generating an indicating output in response to the last trailing edge control impulse indicative of the validity of said data signal as a function of a preselected relationship between said stored sampled data outputs and indicative of the invalidity of said data signal as a function of the absence of said relationship.

* * * * *